United States Patent [19]

Lemme

[11] Patent Number: 4,556,935
[45] Date of Patent: Dec. 3, 1985

[54] ADJUSTABLE SHAPE MEMORY METAL ACTUATOR

[75] Inventor: Charles D. Lemme, Tucson, Ariz.

[73] Assignee: Blazer International Corp., Franklin Park, Ill.

[21] Appl. No.: 705,978

[22] Filed: Feb. 27, 1985

[51] Int. Cl.⁴ .............................................. F03G 7/06
[52] U.S. Cl. .................................. 362/279; 362/325; 337/140; 60/527
[58] Field of Search .................. 337/140; 60/527, 528, 60/529; 362/279, 325, 321, 274, 277

[56] References Cited

U.S. PATENT DOCUMENTS

| | | | |
|---|---|---|---|
| 3,922,591 | 11/1975 | Olsen | 337/140 |
| 4,305,250 | 12/1981 | Cory | 60/527 |
| 4,490,975 | 1/1985 | Yaeger et al. | 337/140 |
| 4,524,343 | 6/1985 | Morgan et al. | 337/140 |

FOREIGN PATENT DOCUMENTS

| | | | |
|---|---|---|---|
| 749818 | 1/1967 | Canada | 362/419 |
| 637132 | 4/1928 | France | 362/279 |

*Primary Examiner*—Craig R. Feinberg
*Assistant Examiner*—David A. Okonsky
*Attorney, Agent, or Firm*—Willian Brinks Olds Hofer Gilson & Lione Ltd.

[57] ABSTRACT

A shape memory metal actuator includes an actuator element that is secured at one end to an end fitting which is in turn secured to an overload protection spring. An adjustable screw is mounted to a frame and is positioned such that the overload protection spring biases the end fitting into contact with the adjustment screw. The end fitting lifts off of the adjustment screw when excessive stretching forces are applied to the actuator element. The adjustment screw can be moved to vary the rest position of the end fitting, thereby allowing manual compensation for cyclic creep of the actuator element.

10 Claims, 8 Drawing Figures

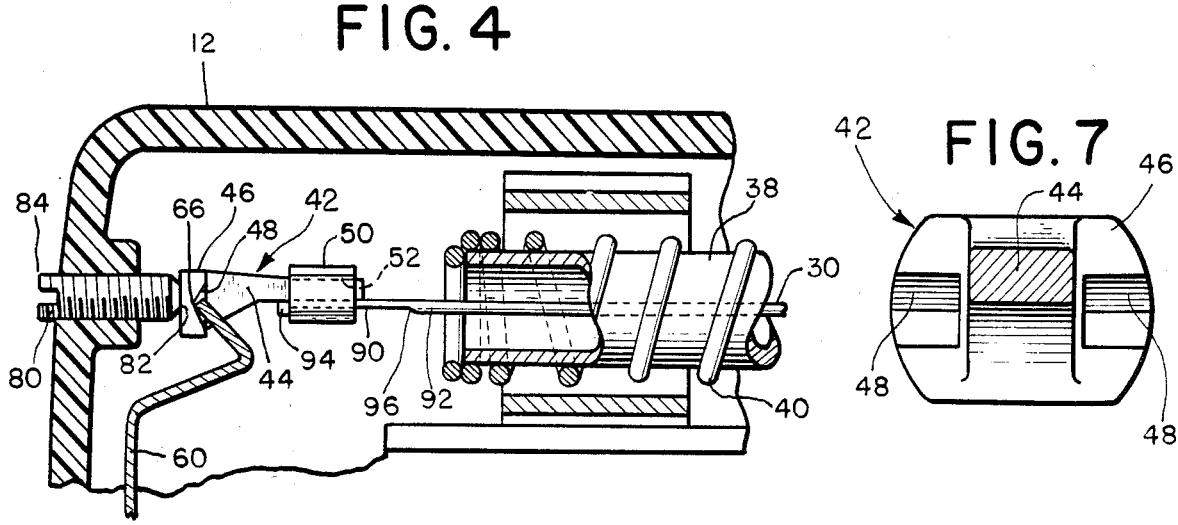
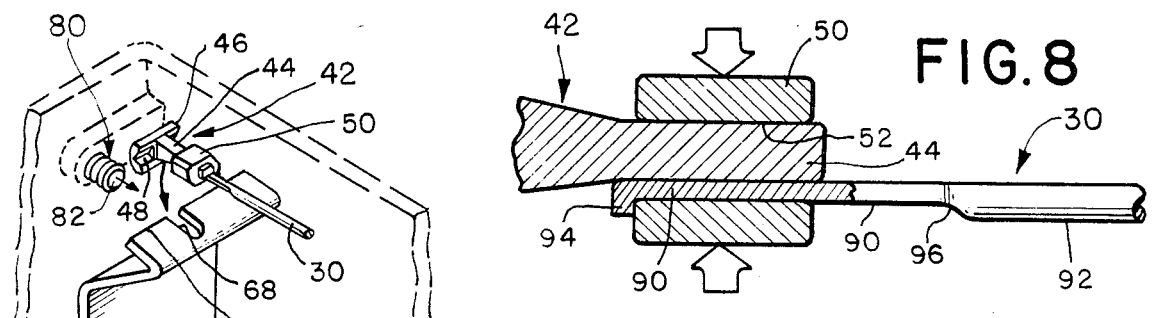
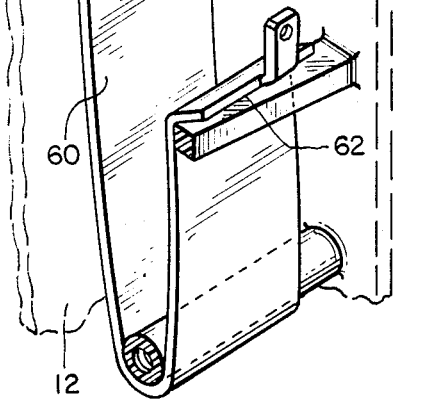
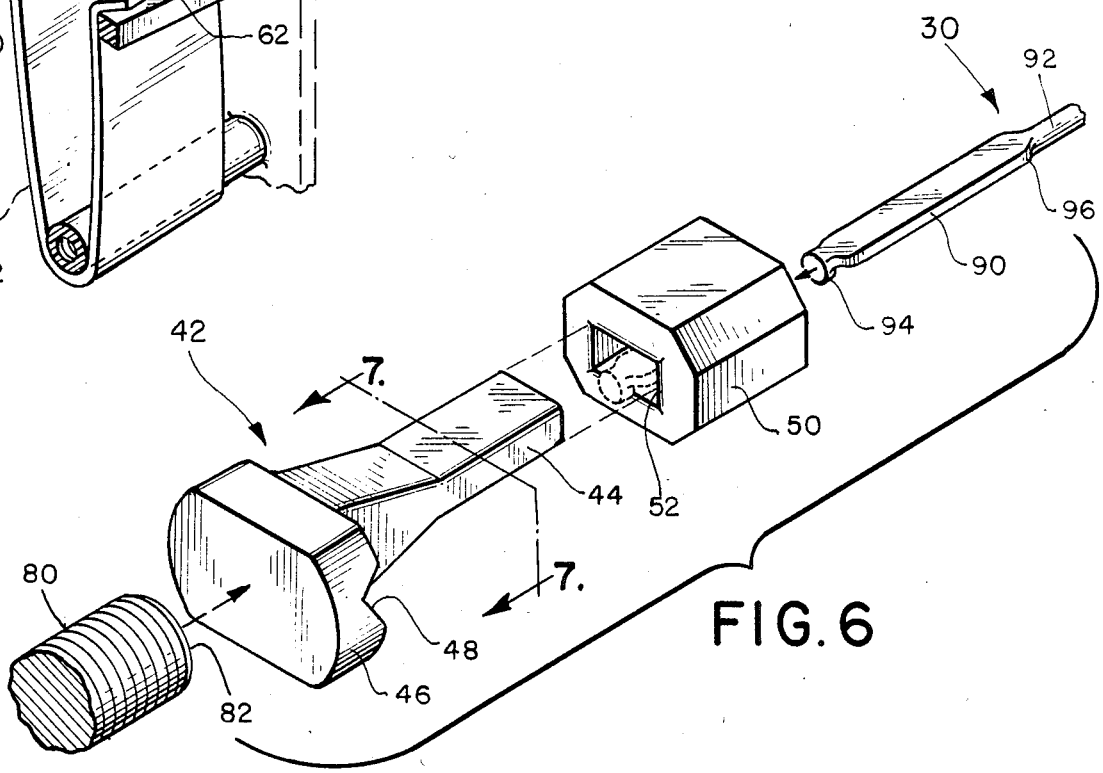

12,556,935

ADJUSTABLE SHAPE MEMORY METAL ACTUATOR

BACKGROUND OF THE INVENTION

The present invention relates to an improved shape memory metal (SMM) actuator which can readily be adjusted to compensate for cyclic creep.

SMM actuators typically utilize an actuator element made of a shape memory metal such as a nickeltitanium alloy. Such materials are characterized by a transition temperature at which they transform from a martensitic state to an austenitic state. During this transformation, the SMM actuator element can do work. It is well known that as SMM actuator elements are cycled in temperature the effective length of the SMM element gradually increases, both when in the austenitic state and when in the martensitic state. Such a gradual increase in length is typically referred to as cyclic creep. If not corrected, cyclic creep can adversely degrade the effective stroke of the SMM actuator. In addition, it is widely recognized that SMM actuator elements should be protected from excessive stresses if the life of the actuator element is not to be unduly shortened. U.S. Pat. No. 4,490,975 addresses problems related to both cyclic creep and overload protection for SMM actuator elements.

SUMMARY OF THE INVENTION

This invention is directed to an improved SMM actuator which allows manual adjustment for cyclic creep in a remarkably simple and straightforward manner.

According to this invention, a shape metal memory actuator is provided which comprises a frame and a shape metal memory metal actuator element having first and second ends and defining a direction of motion. Means are provided for connecting the first end of the actuator element to an actuator terminal which is movable with respect to the frame. An adjustment member is adjustably positioned with respect to the frame along the direction in motion and defines a stop surface. An overload protection spring is mounted between the frame and the second end of the actuator element and is oriented to bias the second end to a rest position determined by the stop surface. The overload protection spring biases the second end with a selected force which allows the second end to pull away from the stop surface when excessive forces are applied to the actuator terminal, thereby protecting the actuator element from excessive forces. The adjustment member and the overload protection spring cooperate to permit adjustment of the rest position of the second end of the actuator element, thereby allowing manual compensation for cyclic creep.

The preferred embodiment described below is a simple, inexpensive actuator which provides both overload protection to the shape memory metal element as well as provision for manual adjustment to compensate for cyclic creep. Without such compensation for cyclic creep, the life of a shape memory metal actuator is often limited by the gradual reduction in stroke caused by cyclic creep. The preferred embodiment described below, by allowing manual compensation for cyclic creep, allows the stroke of the actuator to be maintained even in the face of cyclic creep, thereby extending the life of the actuator.

The invention itself, together with further objects and attendant advantages, will best be understood by reference to the following detailed description, taken in conjunction with the accompanying drawings.

BRIEF DESCRIPTION OF THE ACCOMPANYING DRAWINGS

FIG. 4 is an enlarged view taken in the plane of FIG. 2 of a portion of the actuator of FIG. 2.

FIG. 5 is an exploded perspective view of a portion of the actuator of FIG. 4.

FIG. 6 is an exploded perspective view of an end portion and an end fitting of the actuator of FIGS. 4 and 5.

FIG. 7 is a cross-sectional view taken along line 7—7 of FIG. 6.

FIG. 8 is a cross-sectional view showing a completed connection between an actuator element and an end fitting of the actuator of FIGS. 4 and 5.

DETAILED DESCRIPTION OF THE PRESENTLY PREFERRED EMBODIMENT

Figure 1:
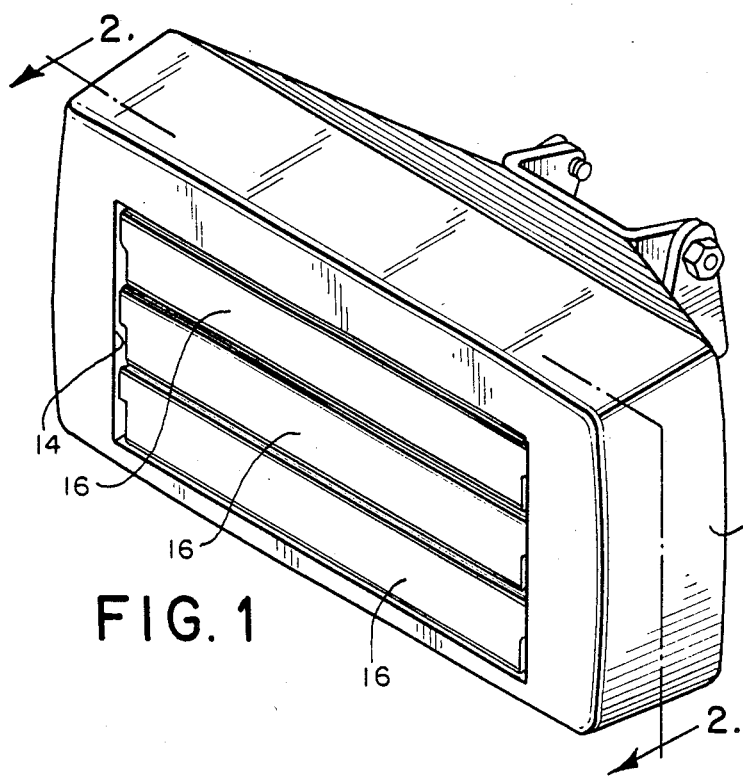
FIG. 1 is a perspective view of a louvered lamp which includes a presently preferred embodiment of the actuator of this invention.

Turning now to the drawings, reference numeral 10 refers to the presently preferred embodiment of the actuator of this invention. For purposes of illustration, the actuator 10 is shown connected to a louvered lamp.

Figure 3:
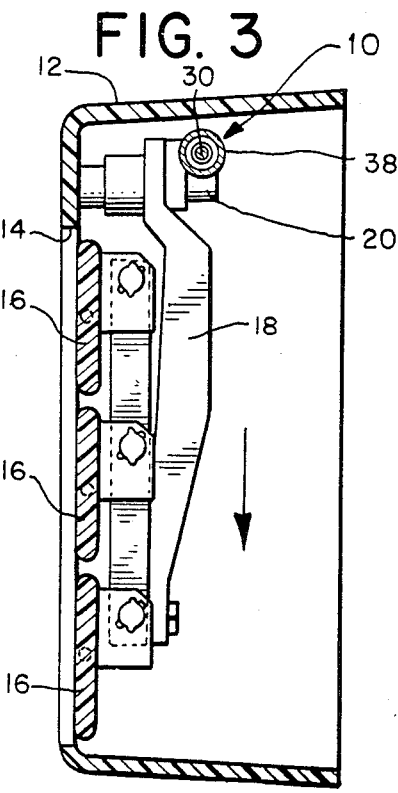
FIG. 3 is a cross-sectional view taken along line 3—3 of FIG. 2.
Figure 2:
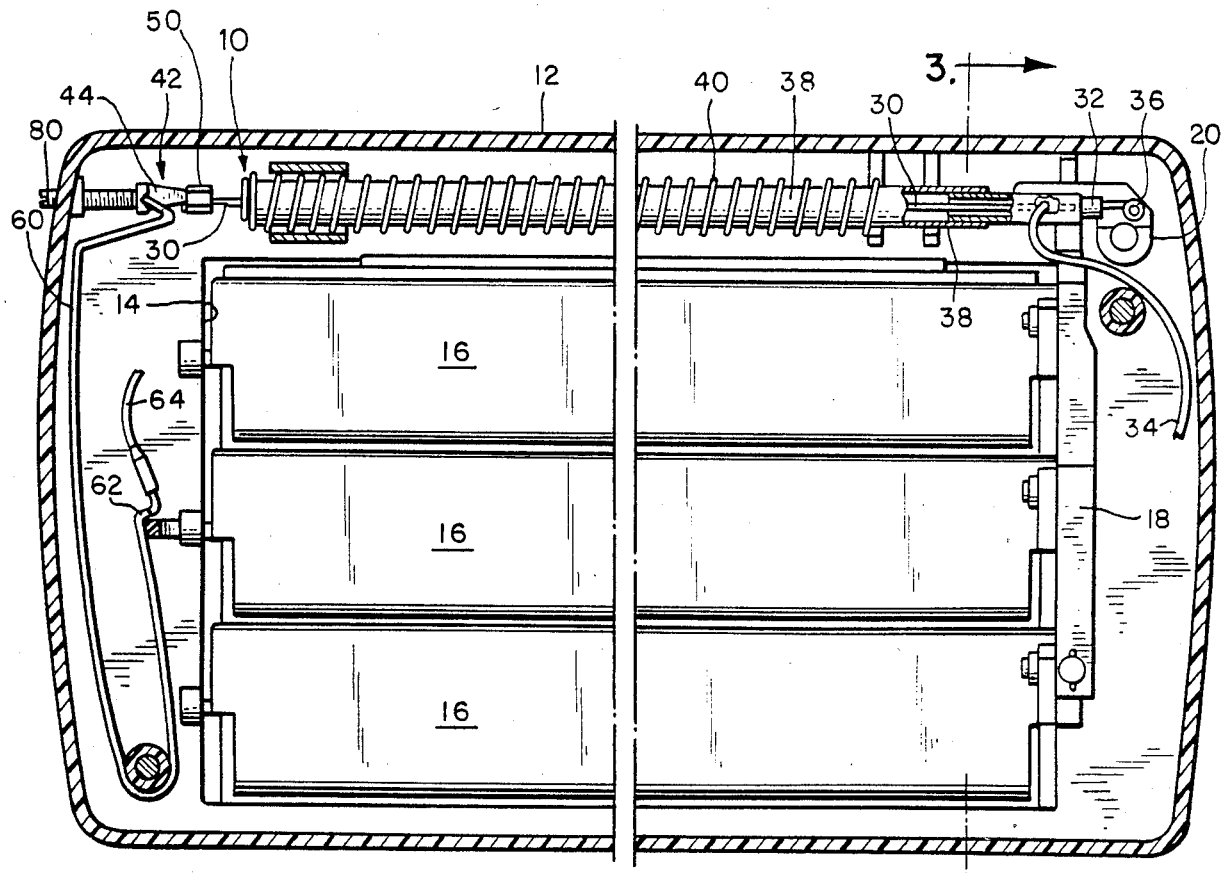
FIG. 2 is a cross-sectional view taken along line 2—2 of FIG. 1.

As shown in FIGS. 1–3, the actuator 10 is mounted within a lamp housing 12 which defines a lens opening 14. Several spaced louvers 16 are mounted to extend across the lens opening 14, and the louvers 16 are linked together by a cross bar 18. The cross bar 18 is in turn linked to a bell crank 20. The housing 20, louvers 16 and linkage 18,20 of this preferred embodiment are identical to those described in greater detail in a copending U.S. patent application Ser. No. 703,895, filed Feb. 21, 1985, entitled Automatic Takeup and Overload Protection Device for Shape Memory Metal Actuator and assigned to the assignee of this invention. This application is hereby incorporated by reference for its detailed description of the louver linkage.

The actuator 10 includes an actuator element 30 which in this embodiment is a straight length of an SMM wire such as Nitinol. This actuator element 30 is connected at one end to a first end fitting 32 which defines an eye 36 shaped to mount to the bell crank 20. The first end fitting 32 serves to mount an electrical lead 34 as well as a rigid metal tube 38 which is concentric with the actuator element 30. A return spring 40 is mounted around the exterior of the tube 38 to bias the tube 38 to the right as shown in FIG. 2, thereby biasing the louvers 16 to the closed position. The above-identified U.S. Patent application should be referenced for further details of the structure and operation of the actuator element 30 and the return spring 40.

As shown in FIGS. 4–7, the other end of the actuator element 30 is secured to a second end fitting 42 which defines a relatively narrow shank 44 and a relatively broader head 46. The head 46 defines two V-shaped grooves 48.

The actuator element 30 is secured to the first and second end fittings 32,42 by respective clamps 50. In this embodiment, the clamps 50 each define central openings 52 and are formed of a material such diecast zinc. The clamps 50 are crimped in place as shown in FIG. 8 in order to hold the first and second end fittings 32, 42 to respective ends of the actuator element 30.

An overload protection spring 60 which in this embodiment is a leaf spring 60 defines a fixed end 62 fixedly mounted to the housing 12. An electrical lead 64 is secured to this fixed end 62. The spring 60 also defines a free end 66 which defines a slot 68 sized to receive the shank 44. When assembled as shown in FIG. 4, the shank 44 is received in the slot 68 and the free end 66 is received in the groove 48 to engage the second end fitting 42 and therefore the actuator element 30 to the free end 66 of the overload protection spring 60.

An adjustment screw 80 is threadedly mounted to the housing 12. This adjustment screw 80 defines a slotted head 84, which is accessible from the exterior of the housing 12, and a stop surface 82. The adjustment screw 80 is positioned such that the overload protection spring 60 biases the head 46 of the second end fitting 42 into contact with the stop surface 82. Thus, the stop surface 82 defines the rest position of the second end fitting 42.

FIG. 6 shows an enlarged view of one of the ends of the actuator element 30 prior to attachment to the clamp 50. Preferably, the two ends of the actuator 30 are identical. As shown in this figure, the actuator element 30 defines a cold formed region 90 next to an adjacent region 92 of the actuator element 30. The extreme end 94 of the actuator element 30 is undeformed and retains the original shape. In this preferred embodiment, the undeformed shape of the actuator element 30 is a wire having a diameter of 0.5 mm. Thus, both the extreme end region 94 and the adjacent region 92 have a diameter of 0.5 mm. The cold formed region 90 has a thickness of 0.2 mm. The junction between the cold formed region 90 and the adjacent region 92 defines a transition zone 96 which is smoothly radiused with a radius of curvature of 0.2 mm. In this embodiment, the clamp 50 is 3 mm in length, the cold formed region 90 is 5.5 mm in length, and therefore approximately 2.5 mm of the cold formed region 90 extends out of one end of the clamp 50 (FIG. 8). For this reason, the transition zone 96 is spaced from the clamp 50 by 2.5 mm, about five times the diameter of the adjacent region 92. In this embodiment, the cold formed region 90 is formed in a single pressing operation with a hydraulic press. However, other cold forming methods are believed to be suitable as well.

SMM is transformed into the much harder and stronger austenitic state when it is severely cold worked. In particular, if an SMM wire is deformed to about 40% of its original diameter, the flattened portion is extremely strong and hard. In fact, in the presently preferred embodiment tungsten carbide anvils are used to cold work the SMM wire. When Nitinol is cold worked, high speed tool steel is indented by the SMM wire.

Since the cold formed region 90 is fully austenitic throughout the temperature cycling of the actuator element 30, it is of no consequence that the cold formed region 90 remains cool due to the heat sink characteristics of the end fitting 42. Because the cold formed region 90 remains in the austenitic state it retains sufficient strength and does not tend to elongate and break. Because the transition zone 96 is spaced from the clamp 50 by about five times the diameter of the actuator element 30, the transition zone 96 is heated above the transition temperature of the SMM wire during temperature cycling of the actuator element 30, thereby reducing the tendency of the actuator element 30 to fracture at the transition zone 96.

The transition zone 96 is provided with a gentle radius between the cold formed region 90 and the adjacent region 92 in order to minimize any increase in the average stress. The extreme end 94 is allowed to remain in the original round form so as to form an anchor point that will resist any tendency of the actuator element 30 to slip out of the clamp 50.

The overload protection spring 60 cooperates with the adjustment screw 80 to protect the actuator element 30 from excessive stresses and to provide ready adjustment of the rest position of the second end fitting 42. In this way, overall elongation of the actuator element 30 due to cyclic creep can be compensated for. In this preferred embodiment, the overload spring 60 biases the second fitting 42 against the stop surface 82 with an installed spring force of about 700 grams and a spring rate of about 180 grams/mm. In the event applied forces on the actuator element 30 exceed 700 grams, the overload spring 60 flexes, allowing the second end fitting 42 to move away from the adjustment screw 80. In this way, the actuator element 30 is protected from excessive stretching forces.

In effect, the adjustable screw 80 defines an adjustable rest position for the second end fitting 42 of the actuator element 30. When the length of the actuator element 30 increases during use due to cyclic creep, the adjustment screw 80 can be moved to take up the increased length of the actuator element 30. In this way, the effective stroke of the actuator element 30 is preserved, even in the face of cyclic creep.

Of course, it should be understood that a wide range of changes and modifications can be made to the preferred embodiment described above. For example, the actuator 10 can be used in a wide variety of settings in addition to the louvered lamp shown. Furthermore, the adjustment member and overload protection spring can be adapted for use in a wide variety of actuators, and other methods for attaching fittings to the end of the actuator element (e.g. adhesives such as epoxy or low temperature solder) can be used. In addition, it is not critical that the cold formed end portion of the actuator element be used in all embodiments. It is therefore intended that the foregoing detailed description be regarded as illustrative rather than limiting, and that it be understood that it is the following claims, including all equivalents, which are intended to define the scope of this invention.

We claim:

1. A shape memory metal actuator comprising:
   a frame;
   a shape memory metal actuator element having first and second ends and defining a direction of motion;
   means for connecting the first end of the actuator element to an actuator terminal which is movable with respect to the frame;
   an adjustment member which is adjustably positioned with respect to the frame along the direction of motion and defines a stop surface;
   an overload protection spring mounted between the frame and the second end of the actuator element and oriented to bias the second end to a rest position determined by the stop surface, said overload protection spring biasing the second end with a selected force which allows the second end to pull away from the stop surface when excessive forces are applied to the actuator terminal, thereby protecting the actuator element from excessive forces;

said adjustment member and overload protection spring cooperating to permit adjustment of the rest position of the second end of the actuator element.

2. The invention of claim 1 wherein the spring comprises a leaf spring.

3. The invention of claim 1 wherein the adjustment member comprises a screw threaded to the frame, and wherein the stop surface is located on a free end of the screw.

4. The invention of claim 1 wherein the actuator element is rectilinear in shape.

5. The invention of claim 1 wherein the frame comprises a lamp housing which defines a lens opening, wherein a plurality of louvers are mounted to the housing to extend across the lens opening, and wherein the actuator terminal is coupled to the louvers to position the louvers.

6. The invention of claim 1 wherein a fitting is secured to the second end of the actuator element, and wherein the spring biases the fitting into contact with the stop surface.

7. The invention of claim 6 wherein the fitting comprises a shank coupled to the second end and a head which defines a pair of recesses; and wherein the spring defines a slot sized to receive the shank and a pair of edges positioned to fit within and engage the recesses.

8. A louvered lamp comprising:

a lamp housing which defines a lens opening;

an array of louvers mounted to the housing to extend across the lens opening;

a leaf spring defining a first end mounted to the housing and a second end;

an adjustment screw threaded to the housing and having a free end adjacent to the second end of the spring and a head accessible from outside the housing;

a shape memory metal actuator element defining first and second ends;

means for coupling the first end of the actuator element to the louvers;

a fitting secured to the second end of the actuator element, said fitting engaged with the second end of the spring such that the spring biases the fitting to a rest position in contact with the free end of the screw with a selected force which allows the fitting to pull away from the screw when excessive forces are applied to the first end of the actuator element, thereby protecting the actuator element from excessive forces;

said adjustment screw and spring cooperating to permit adjustment of the rest position of the second end of the actuator element.

9. The invention of claim 8 wherein the actuator element is rectilinear in shape.

10. The invention of claim 8 wherein the fitting comprises a shank coupled to the second end and a head which defines a pair of recesses; and wherein the spring defines a slot sized to receive the shank and a pair of edges positioned to fit within and engage the recesses.

* * * * *